Figure 1:
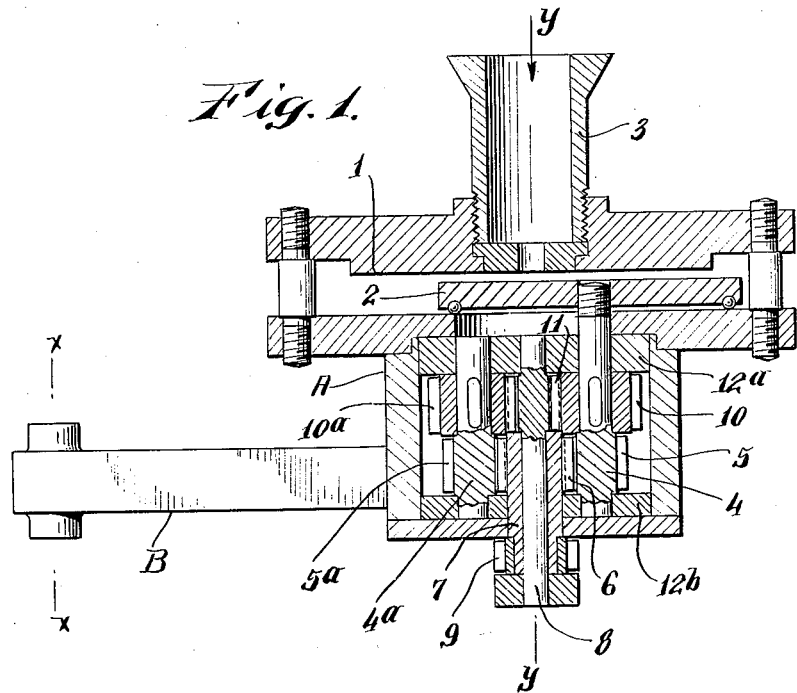

Sept. 11, 1951 — R. COLOMBO — 2,567,274
APPARATUS FOR KNEADING AND MANUFACTURING
GRANULATED PLASTIC MASSES
Filed Feb. 19, 1948

INVENTOR.
Roberto Colombo
BY
Hazeltine, Lake & Co.
AGENTS.

Patented Sept. 11, 1951

2,567,274

UNITED STATES PATENT OFFICE 2,567,274

APPARATUS FOR KNEADING AND MANUFACTURING GRANULATED PLASTIC MASSES

Roberto Colombo, Turin, Italy

Application February 19, 1948, Serial No. 9,583
In Italy May 15, 1944

Section 1, Public Law 690, August 8, 1946
Patent expires May 15, 1964

2 Claims. (Cl. 18—1)

This invention relates more particularly to thermoplastic materials and to the production of the so-called moulding powders. It is known that in order to produce moulding powders for injection purposes, for instance cellulose acetate, it is necessary accurately to knead the cellulose acetate in the form of flakes with suitable softening agents, pigments, dyers, filling substances and the like, and this operation is carried out at high temperature with or without solvents. When all these constituents are well mixed together, it is necessary to subdivide the resulting mass into small granules that can pass into the cylinder of the injecting machine. Generally, this operation is carried out initially at high temperature by cutting the mass into big lumps as it issues from the kneading machine and then subdividing the lumps, after they have been allowed to cool, in suitable breaking machines. The moulding powder is obtained after many operations, but this powder always has admixed thereto a certain quantity of dust which penetrates the piston of the injection machine, disturbing the work. A further disadvantage is that the resulting granules are never of uniform size.

When treating substances with a vinyl chloride base it is necessary to mix the polyvinyl chloride with suitable softening agents, filling substances, pigments, and the like and produce a gelatinisation through which the basic product can be well amalgamated with the other ingredients. This operation is generally carried out by means of cylinders, mixers or drawing presses, whereupon the product is subdivided by means of suitable cutters in order to be introduced into the injection machines or drawing presses.

The same applies to moulding powders with a base of polystyrol, acrylic, benzyl compounds and the like.

All these operations, which obviously vary according to the nature of the substance treated, involve a very wide use of machinery and, in many cases, also of solvents which during the various operations are gradually ejected with considerable losses, as they can never be fully recovered. The slight traces of these solvents, which unavoidably remain in the moulding powders, disturb the production either by injection or drawing of finished articles, for when the powders are brought to the melting temperature, the traces of solvent tends to evaporate leaving bubbles and risers in the finished article.

By the apparatus according to the present invention all the above mentioned disadvantages are eliminated and the following chief advantages are obtained:

1. Elimination of any solvent;
2. Perfect mixing of poly-vinyl chloride or like substance with softening agents, filling matter, pigments, and the like;
3. Production of perfectly uniform moulding powders;
4. Absolute freedom from grinding dust;
5. Large output with reduced use of machinery.

For the production of moulding powders with the apparatus according to this invention, the polyvinyl chloride or like substances with the further ingredients should first be accurately and thoroughly mixed. This operation may be carried out by means of usual mixers known per se.

The device according to this invention comprises two surfaces facing each other in spaced relationship, depending upon the desired size of the grains. To these surfaces are imparted a double relative rotary movement about their axes and a revolution movement of the axis of one of them about the axis of the other; one of the surfaces is moreover provided with a trough for feeding the mixture into the clearance between the surfaces.

The accompanying drawing shows diagrammatically by way by example one construction of apparatus according to this invention.

Figure 1 shows an axial section and

Figure 2:
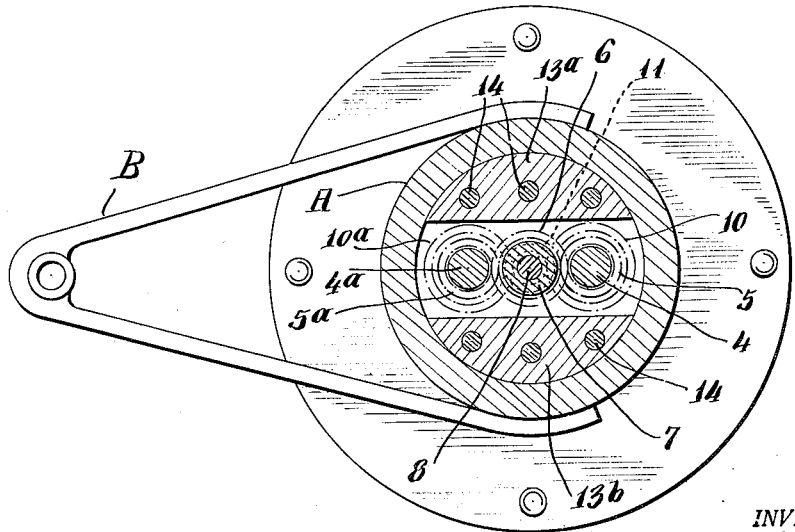

Figure 2 a cross sectional view thereof.

The two surfaces of the device are incorporated in two discs, of which one is stationary and carries the trough, while the other performs a rotary movement about its axis and a revolution movement about the axis of the other disc. A denotes a cylindrical casing coaxial with the disc 1 and supported by a horizontal structure B, articulated about the vertical axis $x$—$x$ to the frame (not shown) of the machine. A cage is rotatably mounted in the said casing and consists of an upper plate 12a and a lower plate 12b and two side walls 13a, 13b, connected to the former by means of rods 14. Two pivots 4, 4a are supported between the two plates 12a, 12b, and are symmetrically arranged with respect to the axis $y$—$y$ of the stationary plate 1 and the casing A. The pivots 4, 4a, carry sets of teeth 5, 5a, integral therewith and have further keyed thereon the toothed pinions 10, 10a, respectively. The pivot 4 projects from the top of the casing A and has secured to its projecting end the movable disc 2. 8 denotes a fixed pivot coaxial with a fixed disc 1 and provided with a set of teeth 11 integral therewith which mesh simultaneously with the pinions 10, 10a.

A sleeve 7 is loosely mounted on the pivot 8 and has secured to its end projecting below the casing A a pinion 9 which receives motion from the motor (not shown). The sleeve 7 carries a set of teeth 6 meshing simultaneously with the sets of teeth 5, 5a on the pivots 4, 4a.

In this manner, when movement is transmitted to the pinion 9, the latter rotates through the gears 6—5—5a the pivots 4, 4a about their axes, thereby rotating the disc 2 about its axis.

At the same time, engagements of the pinions 10, 10a with the sets of teeth 11 on the fixed pivot 8, sets in rotation the cage 12a, 12b, 13a, 13b about the axis y—y, so that the disc 2 performs a movement of rotation about the pivot 4 and a movement of revolution about the axis y—y.

The material issuing from the trough 3 is rolled between the surfaces of the two discs 1 and 2 and is torn forming balls or similar revolution bodies by effect of the speed which increases as the material is moved towards the periphery of the disc 2.

The distance between the axes of the discs 1 and 2 and the size of the discs are such that the disc 2 projects during its revolution from the edge of the disc 1 so that the material is at a certain moment discharged when it is no longer supported by the disc 1.

The discs are for instance of stainless steel. They are provided with heating means and, if desired, cooling means in determined zones. The trough is cooled.

The length of time in which the material remains in the apparatus, and consequently the extent of the mixing and kneading, is determined by the diameter of the discs 1 and 2. These speeds vary according to the material treated, chemical and physical requirements.

It may in some cases not be sufficient to supply the material by fall from the trough and a jig or one or more conveyor screws are employed. In certain cases the discs 1 and 2 need not be both heated, and it will be sufficient to heat one of them, leaving the other cool or, the discs may be heated to a certain temperature in their middle portion and to a lower temperature towards their periphery. These modifications will be determined by the properties of the materials or mixtures employed.

It will be obvious that the constructional details of the device may be varied from what has been described and illustrated by way of example without departing from the scope of this invention.

What I claim is:

1. Apparatus for kneading and producing granulated plastic masses comprising a frame, a flat surface fixed to said frame, a shaft fixed to said frame, a gear fixed on said shaft, a hollow shaft rotatably mounted on said fixed shaft, two gears fixed on said hollow shaft, a cage coaxial with said fixed and hollow shafts and rotatably mounted thereon, two further shafts parallel to the first mentioned shafts and rotatably mounted in said cage, the distances of the axes of said last mentioned shafts from the axes of the first mentioned fixed and rotatable shafts being equal, two gears fixed on each of said last mentioned shafts, one of said gears meshing with one of the gears fixed to the hollow shaft and the other meshing with the gear fixed to the shaft fixed to the frame, one of said last mentioned shafts having fixed to an extension thereof beyond the cage towards the fixed flat surface a further flat surface, means for driving the hollow rotatable shaft, a trough for supplying the material to the clearance between the said fixed and said rotary flat surfaces.

2. Apparatus for kneading and producing granulated plastic masses comprising a frame, a flat disc fixed to said frame, a shaft fixed to said frame, a gear fixed on said shaft, a hollow shaft rotatably mounted on said fixed shaft, two gears fixed on said hollow shaft, a cage formed by two opposed flat surfaces and means for rigidly connecting them together, said cage being coaxial with said fixed and hollow shafts, the two surfaces being bored to provide a seat for two further shafts parallel with the axis of the cage and rotatably mounted in said cage, the distances between the axis of each of said last mentioned shafts and the axis of the cage being equal, two gears fixed on each of said mentioned shafts, one of said last mentioned gears meshing with one of the gears fixed to the hollow shaft, and the other meshing with the gear fixed to the shaft fixed to the frame, one of said last mentioned shafts having fixed to an extension thereof beyond the cage towards the fixed flat disc a further flat disc, means for driving the hollow rotatable shaft, a trough arranged along the axis of the stationary disc for supplying the material to the clearance between said disc and the rotating disc.

ROBERTO COLOMBO.

REFERENCES CITED

The following references are of record in the file of this patent:

UNITED STATES PATENTS

| Number | Name | Date |
|---|---|---|
| 1,137,224 | McCool | Apr. 27, 1915 |
| 1,144,305 | McCool | June 22, 1915 |
| 2,209,696 | Ives | July 30, 1940 |
| 2,232,444 | Frenkel | Feb. 18, 1941 |

FOREIGN PATENTS

| Number | Country | Date |
|---|---|---|
| 614,446 | Great Britain | Dec. 15, 1948 |